United States Patent [19]
Harcuba

[11] 3,841,857
[45] Oct. 15, 1974

[54] METHOD FOR THE CONTINUOUS PRODUCTION OF GLASS, ESPECIALLY GLASS POSSESSING A SUBSTANTIALLY BAND-SHAPED CROSS-SECTIONAL CONFIGURATION

[75] Inventor: Siegfried Harcuba, Saarbrucken, Germany

[73] Assignee: Transglas Patent- und Lizenzverwertungs AG, Chur, Switzerland

[22] Filed: Feb. 26, 1973

[21] Appl. No.: 335,477

Related U.S. Application Data
[63] Continuation of Ser. No. 75,943, Sept. 28, 1970, abandoned.

[30] Foreign Application Priority Data
Aug. 3, 1970   Switzerland........................ 14935/69

[52] U.S. Cl............................ 65/94, 65/96, 65/99 A
[51] Int. Cl............................................ C03b 17/00
[58] Field of Search........... 65/91, 93, 94, 96, 99 A, 65/148, 151, 182 R, 199, 200, 206

[56] References Cited
UNITED STATES PATENTS

| | | | |
|---|---|---|---|
| 1,541,638 | 6/1925 | Gelstharp............................. | 65/148 |
| 2,754,559 | 7/1956 | Fromson......................... | 65/182 R X |
| 3,345,149 | 10/1967 | Michalik et al..................... | 65/93 X |
| 3,352,657 | 11/1967 | Charnock........................... | 65/94 X |

*Primary Examiner*—Arthur D. Kellogg
*Attorney, Agent, or Firm*—Werner W. Kleeman

[57]   ABSTRACT

A method for the continuous production of glass, preferably glass possessing a substantially band-shaped cross-sectional configuration, which comprises the steps of subjecting glass possessing a viscosity between $10^3$ and $10^{10}$ poise to a uniform pressure at its front and back faces by impacting such glass at such faces with a flowable medium which is at about 0.7 to 6 atmospheres excess pressure at the point of impact, this medium possessing at least approximately the same temperature as the glass at the location of impact of such medium with the glass.

26 Claims, 15 Drawing Figures

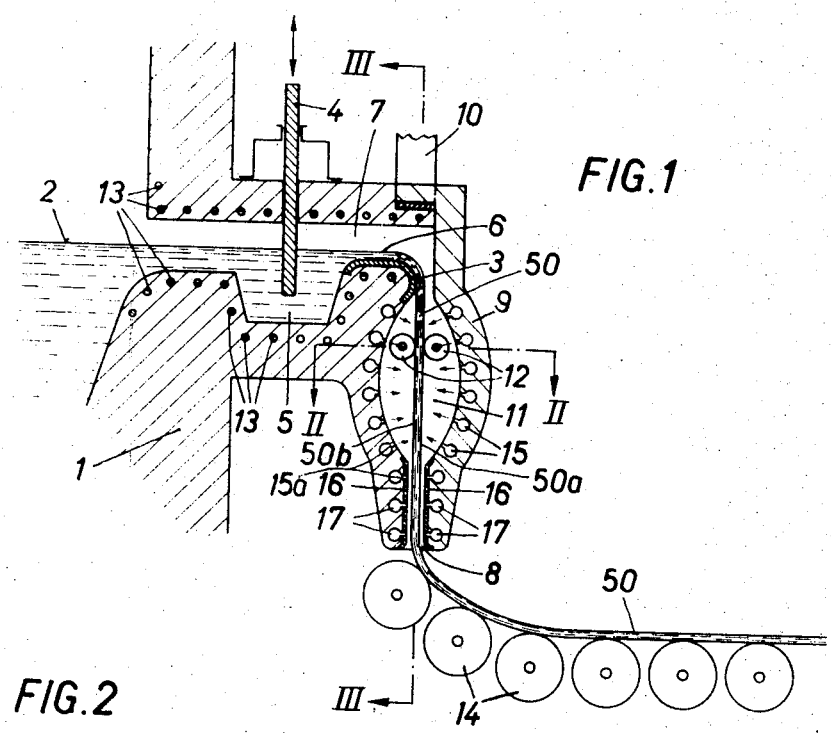
FIG.1
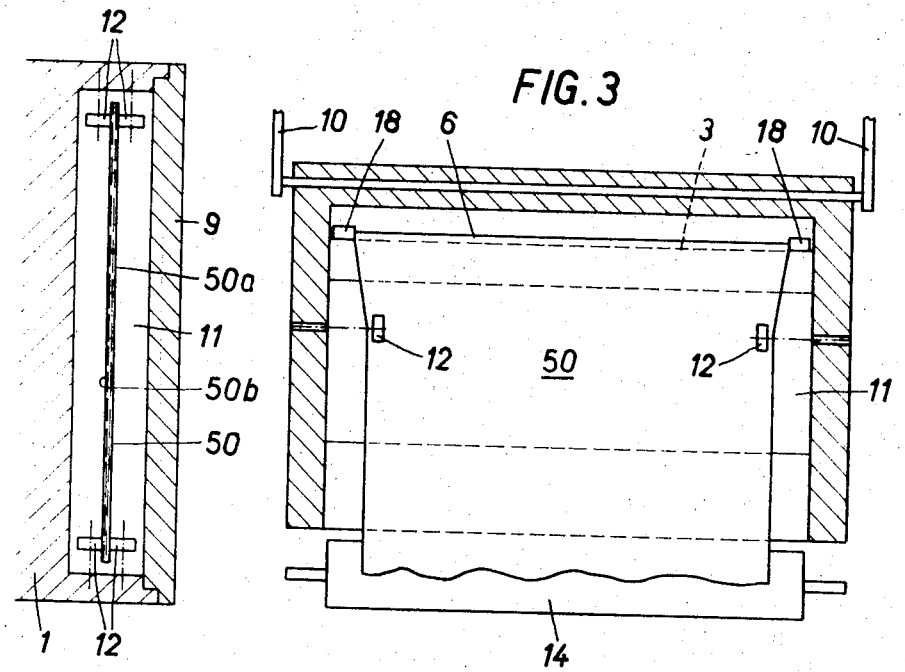
FIG.2
FIG.3

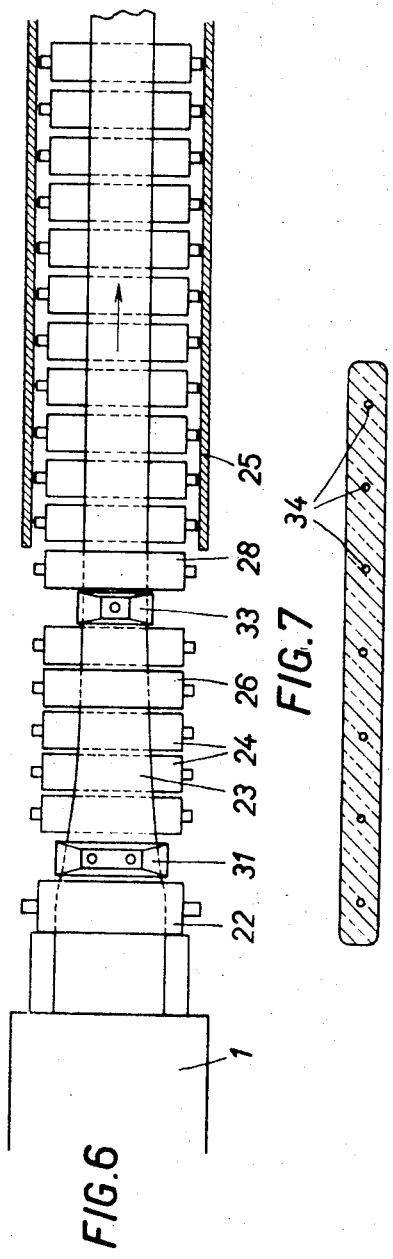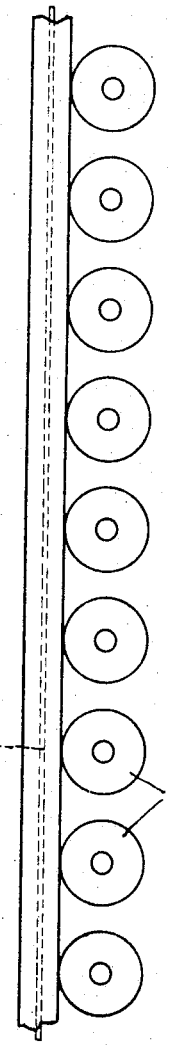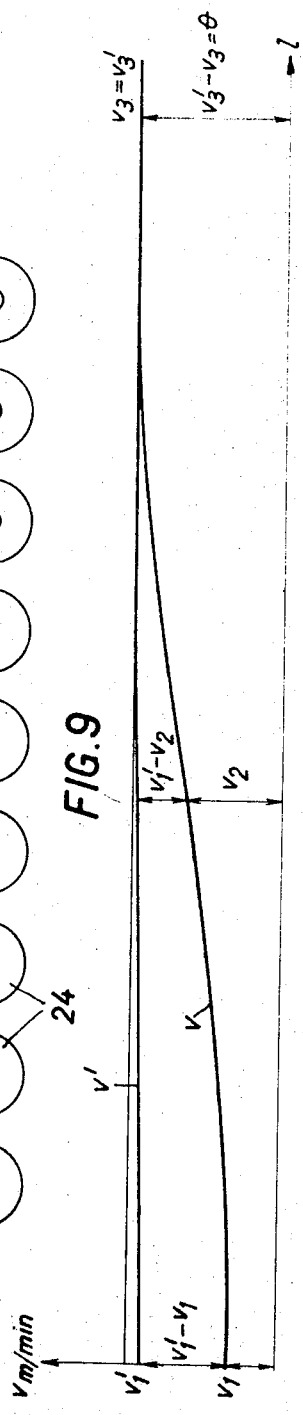

3,841,857

METHOD FOR THE CONTINUOUS PRODUCTION OF GLASS, ESPECIALLY GLASS POSSESSING A SUBSTANTIALLY BAND-SHAPED CROSS-SECTIONAL CONFIGURATION

CROSS-REFERENCE TO RELATED CASE

This application is a continuation of my copending U.S. application, Ser. No. 75,943, filed Sept. 28, 1970, and entitled "Method For The Continuous Production Of Glass, Especially Glass Possessing A Substantially Band-Shaped Cross-Sectional Configuration" and now abandoned.

BACKGROUND OF THE INVENTION

The present invention relates to a new and improved method for the continuous production of glass, especially glass possessing a substantially band-shaped cross-sectional configuration.

It is known to obtain glass possessing improved physical properties, especially increased strength, if a mechanical stress is produced at a surface layer of the glass by means of a primarily uniform pressure. With the known prior art technique for the fabrication of such "hardened" or "tempered" glass the surface layer possessing a mechanical stress is either produced by harshly or suddenly cooling the glass heated above its solidification temperature, by uniting or laminating two glass layers having different coefficients of expansion, or by exchanging ions having a smaller diameter for ions with a larger diameter.

Still the state-of-the-art techniques do not, however, permit continuous production of glass, or the fabricated glass no longer can be cut. Furthermore, the fabrication of tempered or hardened glass in accordance with the known techniques is expensive and complicated.

SUMMARY OF THE INVENTION

Accordingly, there is a real need in the art for an improved method for the production of glass, especially glass of band-like configuration, which is not associated with the aforementioned drawbacks of the prior art techniques. Hence, a primary objective of this invention is concerned with this very problem and proposes a new and improved method for the continuous production of glass which is not associated with the drawbacks of the prior art explained above and which effectively and capably fulfills this need.

Another and more specific object of the present invention is the provision of an improved method for the production of glass exhibiting enhanced physical properties, especially improved strength, which glass can be fabricated in a simple and rational manner according to the method aspects of the invention, and wherein the fabricated glass also can be subsequently worked as desired.

Still, a further significant object of this invention is the provision of a glass manufacturing technique employing relatively simple process steps, providing manufacturing economy as well as improved properties of the finished product produced.

Now, in order to implement these and still further objects of the invention, which will become more readily apparent as the description proceeds, the glass fabricating technique of the present invention contemplates subjecting the glass while it possesses a viscosity between $10^3$ and $10^{10}$ poise, to a uniform pressure at its front and back faces by impacting the glass at such faces with a flowable or fluent medium which at the point of impact is at an atmospheric excess pressure in the range of 0.7 to 6, this medium possessing at least approximately the same temperature as the glass at the location where such medium contacts the glass.

The realization of improved physical properties of the glass, especially an increased strength, can be achieved with the inventive method by impacting the glass with a pressurized medium without thus appreciably cooling the glass. Especially advantageous results can thus be attained if the glass is stretched or elongated by at least about 30 percent at the region of impact of the pressurized medium. In the event that a wire- or band-like insert is provided for the glass this stretching is reduced or diminished by that amount by which the glass particles surrounding the insert are entrained by such insert during the stretching operation.

BRIEF DESCRIPTION OF THE DRAWINGS

The invention will be better understood and objects other than those set forth above will become apparent, when consideration is given to the following detailed description thereof. Such description makes reference to the annexed drawings illustrating various exemplary embodiments of glass forming apparatus and techniques for purposes of elucidating the inventive method aspects, and wherein:

FIG. 1 schematically illustrates in elevational view, partly in cross-section, a first form of apparatus for the continuous production of glass according to a first embodiment of the inventive method;

FIG. 2 is a horizontal cross-sectional view of the glass manufacturing apparatus of FIG. 1, taken substantially along the line II—II thereof;

FIG. 3 is a vertical cross-sectional view of the glass manufacturing apparatus of FIG. 1, taken substantially along the line III—III thereof;

FIG. 6 is a top plan view of the glass fabrication apparatus of FIG. 4;

FIG. 7 is a cross-sectional view through a glass band or sheet containing embedded wires;

FIG. 8 is a fragmentary view of a portion of the glass band with the embedded wires;

FIG. 9 is a graph showing the course of the velocity curves for the glass and the embedded wires during stretching of a glass band of the type shown in FIGS. 6 and 7;

DETAILED DESCRIPTION OF THE PREFERRED EMBODIMENTS

Figure 4:
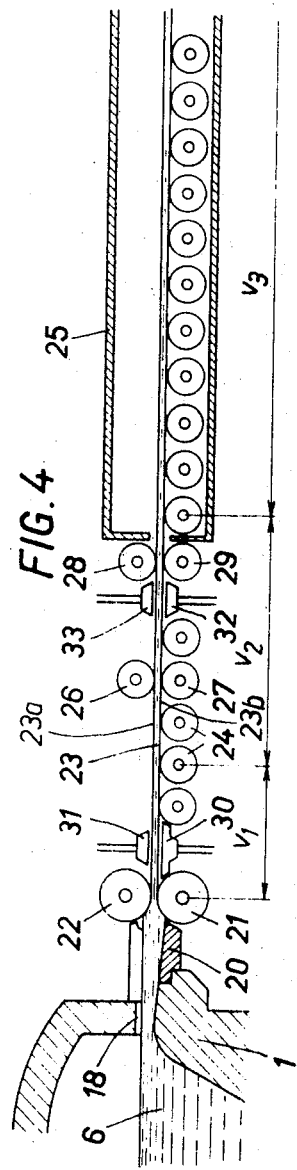
FIG. 4 schematically illustrates in elevational section a further form of apparatus for the continuous production of glass in accordance with a second embodiment of the inventive method.
Figure 5A:
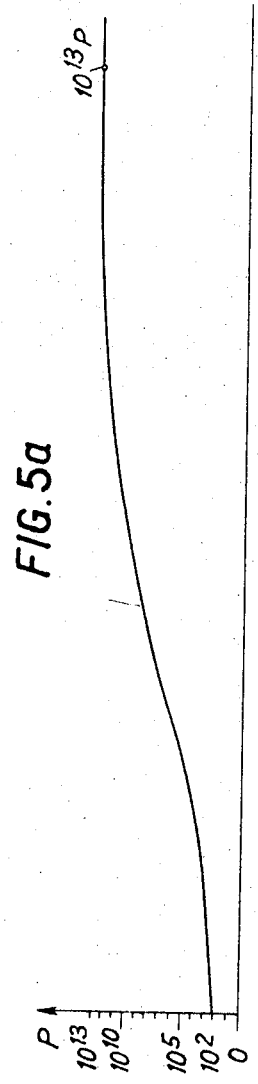
FIG. 5a is a graph depicting the viscosity conditions of the glass along the production path of the apparatus of FIG. 4.
Figure 5B:
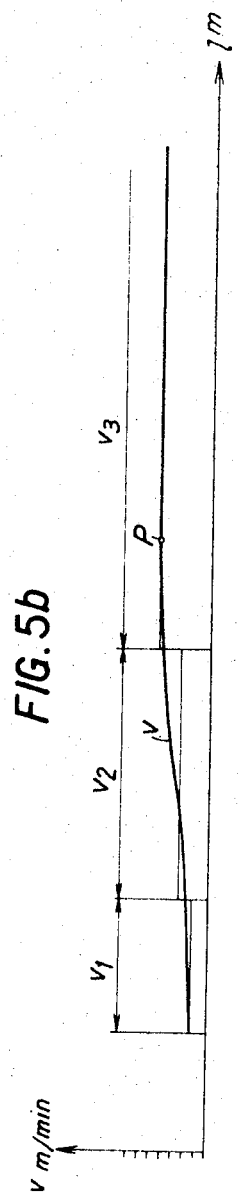
FIG. 5b is a further graph depicting the velocity of the glass along the production path of the apparatus of FIG. 4.

Describing now the drawings, FIG. 1 schematically illustrates a glass manufacturing apparatus for the continuous production of massive glass in band-like configuration. More precisely, FIG. 1 depicts a portion of a glass furnace 1 equipped with a discharge or outflow lip 3 formed of smooth and refractory material. The glass which is melted in the furnace so as to possess a constant chemical composition and under constant thermal conditions will be seen to exhibit a bath height or level 2 and flows beneath a cut-off or closure slide member 4 heated to the temperature of the glass within the furnace 1. The molten glass upon passing beneath the cut-off slide member 4 flows through the furnace compartment 7 towards the discharge lip 3. The cut-off slide member 4, which can be preferably heated electrically, may be displaced by any suitable mechanism in the vertical direction, as indicated by the double-headed arrow, so that the through-passage opening 5 between the furnace and the lip, and therefore the height or thickness of the glass 6 flowing out of the furnace 1 over the lip 3 can be selectively adjusted. Additionally, the cut-off slide member 4 serves to maintain the furnace or combustion air out of contact with the lip 3, thus preventing contamination of the glass flowing over this lip.

The glass which flows over this lip member 3 in the form of a glass band or sheet 50 possesses, for instance, a viscosity of about $10^3$ poise, but could possess an even greater viscosity. Furthermore, this glass band 50 flows vertically downwards under the action of gravity through a compartment 11 which possesses a substantially oval cross-sectional configuration. Compartment 11 maintains the downwardly flowing glass band 50 out of contact with the ambient or surrounding air. Due to the gravity effects the glass band 50 within the compartment 11 is stretched or drawn, whereby the length of the downwardly flowing band is chosen such that the glass band is stretched by at least 30% due to its own weight.

The glass band subjected to the stretching operation or elongation in the compartment 11 is simultaneously impacted or blown with a fluent or flowable medium, preferably air or a noble gas, such as for instance helium, which is pre-heated at least approximately to the temperature of the glass band. It is also possible to use for the flowable or fluent medium nitrogen, or else however a liquid-gas mixture, a liquid, or a liquid mixture. If the optical properties of the glass are to be varied, then, it is advantageous to select such fluent media, the solid constituents of which are anhydrous salts. Further, it is here mentioned that the fluent material or medium can contain potassium, rubidium or cesium.

The flowable or fluent medium is introduced via conduits 15 to associated nozzles provided at the wall of the compartment 11, the medium itself flowing out of such nozzles at a pressure which, as a function of the spacing of the nozzle outlets from the glass band 50 and the temperature of the latter, is sufficient to produce an impingement or impact pressure in the range of 0.7 to 2 atmospheres excess pressure at the front face 50a and the back face 50b of the glass band 50, as desired. Furthermore, these nozzles, which have been schematically indicated at 15a in FIG. 1, can be distributed along the wall of the compartment 11 in such a fashion that the medium flowing out of these nozzles onto the glass band exerts a pressure which is uniform at the front and back faces 50a, 50b of the glass band or ribbon 50 at least at the region of the stretching zone.

The end wall 9 of the compartment 11 can be conveniently removed or raised by means of any suitable mechanical apparatus 10 in order to be able to control the inflow of the glass band 50 into the compartment 11 and in order to also be able to clean the nozzle members 15a at such end wall and likewise also the interior of this compartment. In order to maintain the viscosity of the glass at, for instance, about $10^3$ poise the temperature of the glass from the location of the glass bath up to the discharge of the stretched or elongated glass band out of the compartment 11 is measured by means of suitable thermoelements and the temperature in the compartment 11 is regulated or controlled with the help of suitable heating elements 13 in such a manner that the viscosity of the glass throughout the stretching zone remains approximately equal to that at the lip 3. Naturally, it would also be possible to select a higher viscosity of the glass at the lip 3 and, furthermore, it is possible to provide at the stretching zone a natural increase of the viscosity by omitting or switching out the heating elements 13 if thereby the formation of the outer skin should be enhanced (without chilling, for instance, by using cold air).

The glass band 50 departs from the compartment 11 through a discharge slot 8 at the lower region thereof and after an outer skin has formed at such glass band the latter arrives at a first transport- and deflecting roller 14 of a plurality of such rollers. These transport- and deflecting rollers 14 turn the glass band so that it continues to move in a substantially horizontal direction and in this spatial orientation such band is further transported. In order to accelerate the formation of the outer skin it is possible to equip the discharge slot 8 of the compartment 11 with cooling shoes 16 and cooling conduits 17.

Moreover, in order to prevent undesired shrinkage of the glass band 50 flowing over the lip member 3 and downwards on account of surface stresses of the glass, it is possible to provide in known manner rotatable support elements 12 in the compartment 11. These support or holding elements 12 are driven in opposite rotational sense with a speed which is smaller than the flow velocity of the glass band 50 flowing between these support elements.

Furthermore, with the vertical marginal elements 18 depicted in FIG. 3, it is possible to regulate the width of the downwardly flowing glass band which passes over the lip member 3. These marginal or edge elements or members 18 can be also rotatably constructed so that they move together with the marginal edge of the glass band.

The previously dscribed technique renders possible the continuous fabrication of highly transparent flat or plate glass also in larger thicknesses. This flat glass possesses a practically distortion-free surface and a transparency and surface quality which matches that of "polished" plate or mirror glass. Furthermore, the flat glass produced according to the previously described method possesses a considerably greater strength in the transverse and lengthwise directions than flat glass fabricated according to one of the known state-of-the-art manufacturing techniques.

This affords for transparent flat glass a considerable improvement of the glass qualities, both with regard to its optical properties as well as also with regard to its strength. Even the thickness of polished plate or mirror glass cannot be reached with the same simplicity when utilizing the prior art manufacturing techniques as is possible with the inventive method. It was either necessary to initially produce thick rolled glass and during a second process step to grind away more than half of both surfaces and to polish the new surfaces in order to arrive at polished, flat or plate glass. Or else it was necessary to resort to the more recent float glass process upon a molten metal in order to obtain a polished flat or plate glass possessing distortion-free transparency. However, great difficulties were encountered in the glass technology art if the thus produced glass band should possess a thickness greater than 6 mm, for instance 15 mm. In such case, at the very least a larger proportion of rejects were encountered when employing the float glass process.

In contrast to polished flat or plate glass rolled glass need not possess any clear and distortion-free surface. In fact, such rolled glass in many instances was figured or ornamented. One such type of rolled glass is, for instance, profiled structural glass possessing a substantially U-shaped cross-section.

Such rolled glass oftentimes was provided with embedded wires which serve to adhere the splinters in the event of glass breakage. It is known that such wire glass possesses about 15% less strength than the same glass without wire inserts because of the existing additional stresses.

The method of the invention also renders possible the fabrication of such rolled glass with increased strength. Hereinafter there will be described in conjunction with FIGS. 4 to 14 two exemplary embodiments of the inventive method for the continuous fabrication of rolled glass without and with wire inserts.

In order to manufacture rolled glass there is used a glass batch of the following composition:

69.00% $SiO_2$
14.00% $R_2O$
12.00% $RO$
1.46% $R_2O_3$ wherein R is an alkali metal or an alkaline earth metal
1.94% $B_2O_3$
and the remainder
$TiO_2$ and $SO_3$ FIG. 4 schematically illustrates a further embodiment of apparatus for the continuous fabrication of rolled glass. The glass 6 melted in the furnace 1 passes through a discharge 18 and over a float or bridge stone 20 and arrives at a first pair of rollers consisting of the rolls 21 and 22 which, if desired, can be patterned or ornamented. These rolls 21 and 22 revolve in opposite directions at a peripheral velocity, for instance, of $v_1 = 1.6$ m/min. The glass is engaged by the first pair of rolls 21, 22 and rolled out to form a glass band 23. Glass band 23 is then transferred through the intermediary of the transport or conveying rollers 24 to a roller cooling channel 25 for the purpose of relieving stresses. On its way to this roller cooling channel 25 the glass band 22 passes through a second pair of rollers consisting of the counter-rotating rollers 26 and 27 revolving with a peripheral velocity of, for instance, $v_2 = 2.2$ m/min., and further passes through a third pair of rollers consisting of the counter-rotating rolls 28 and 29 revolving with a peripheral volocity of, for instance, $v_3 = 3.3$ m/min. As a result, the glass band 23 is stretched or elongated between the first roller pair 21, 22 and the second roller pair 26, 27 by about 37% and between the second roller pair 26, 27 and the third roller pair 28, 29 by about 32%. Hence the total elongation or stretching of the glass band thus amounts to approximately 69%. It is here mentioned that it is desirable if the glass band is elongated by at least 30%, and preferably such that the total elongation is in a range of 60% to 80%.

Furthermore, it would be possible to determine and express such elongation as percentual values in that the initial cross-section of the glass band is denoted as $F_1$ and the final cross-section of such glass band as $F_3$, and these values are then expressed in a ratio. By doing so it is possible to prevent equating the increasing course of the roller velocities with the band velocity (stretching) and failing to recognize a deviation between the theoretical and effective or actual stretching or elongation.

Between the first pair of rollers 21, 22 and the second pair of rollers 26, 27 as well as between the second pair of rollers 26, 27 and the third pair of rollers 28, 29 there are arranged at the upper surface and the lower surface of the glass band 23 the globe members 30 and 31 and 32 and 33, respectively, or other suitable fluid medium distributing members. These globe members 30, 31 and 32, 33 are arranged, for instance, above and below the glass band 23 in the transverse direction thereof. Within the globe members there are provided nozzles to which there are delivered via conduits the fluent or flowable medium which is under pressure, preferably helium or air, for the purpose of pressure impact with the glass band. Further, the medium flowing out of the nozzles at the first pressure impact location, and again depending upon the temperature of the glass band 23 an the spacing of the nozzle outlets therefrom, is at a pressure sufficient to produce an impact pressure of 0.7 to 2 atmospheres excess pressure at the front face 23a and back face 23b of the glass band 23, and at the second pressure impact location at a pressure sufficient to produce an impact pressure of 2 to 4 atmospheres excess pressure, when the thickness of the glass band at this second location should amount to about 5 mm. Additionally, the medium, in each instance, possesses at least approximately the same temperature as the glass band at the pressure impact locations. The nozzles are arranged in such a fashion within the globe member that the medium exerts at the glass band a pressure which is practically uniform or constant at the front and back faces of the glass band 23 in the transverse direction.

The temperature of the glass at the first pressure impact location directly behind the first pair of rollers 21 and 22 is such that the viscosity of the glass at this location at least amounts to approximately $10^4$ or $10^5$ poise.

Due to the natural heat or thermal losses along the further transport path the temperature of the glass increases further in such a manner that the viscosity of the glass at the second pressure impact location amounts to approximately $10^8$ to $10^{10}$ poise.

It has been found advantageous to control the thermal or heat losses of the glass through the first stretching or drawing zone such that at most it amounts to 300°C and similarly to control thermal losses of the glass through the second drawing zone so that such at most amounts to 150°C. The viscosity values of the glass as it moves through the installation of FIG. 4 as well as the velocity values thereof have been graphically depicted in FIGS. 5a and 5b respectively, to which reference may be readily had.

Due to impact of the glass band 23 with the medium which is under pressure there is eliminated the transverse contraction of the glass band which is brought about by the stretching operation to which the glass band is subjected, in other words, depending upon the pressure exerted upon the glass band there is brought about a spreading or widening of the glass band across its width prior to stretching. Due to the simultaneous stretching and pressure impact operations to which the glass band is exposed the strength thereof in both the lengthwise- and transverse directions are considerably increased. In fact, the value of the breaking stress in the transverse direction is higher than in the lengthwise direction of the glass band and exceeds the value of 700 kg/cm$^2$.

For instance, single-field beams possessing a spanwidth exceeding 3.3 meters and formed of U-shaped structural glass which has been fabricated according to the previously described method, exhibits a breaking strength exceeding 1000 kg/cm$^2$. The thickness of this glass at the center of the glass band or sheet amounted to 4.8 mm.

If the glass band or sheet is stretched an amount less than 30% of its initial length then no appreciable increase of the strength of the glass in the lengthwise direction occurs. This is apparently attributable to the fact that with such slight elongation of stretching of the glass the entire cross-section of the glass band is no longer subjected to the stretching effect. The subsequent described embodiment of inventive method for the fabrication of substantially U-shaped wire glass will serve to demonstrate that the increased strength in the lengthwise direction of glass bands fabricated according to the described method is at least partially attributable to the fact that the entire cross-section of the glass band is subjected to the stretching operation.

The fabrication of wire glass is undertaken likewise with the apparatus depicted in FIG. 4 and further predominantly according to the previously described method techniques, only with the exception that at the beginning of the production path metal wires 34 (FIGS. 7 and 8) are embedded in the glass band in the lengthwise direction thereof and are drawn or stretched together with such glass band. The wire inserts 34 are suitably embedded approximately centrally at the core zone of the band cross-section. The manner of embedding such wire inserts is not particularly crucial to the invention and any one of the well known prior art techniques suitable for this purpose can be employed. For instance, U.S. Pat. No. 1,541,638, granted June 9, 1925, and No. 1,915,255, granted June 6, 1933, teach prior art techniques for embedding wire in glass.

FIG. 9 graphically illustrates the course of the velocity $v$ of the glass band and the course of the velocity $v'$ of the metal wires over a stretching zone length $l$. The metallic wire formed of a crystalline material elongates slower or less markedly than the glass, accounting for the fact that the initial velocity $v'_1$ of the wires in the glass band is greater than the initial velocity $v_1$ of the glass band itself. Consequently, the glass particles surrounding the wires 34 are entrained by these wires, so that the stretching effect is not limited to the surface layer of a glass band, rather the entire cross-section of the glass band is acted upon due to the glass particles surrounding the reinforcing wires which are entrained by these embedded wires. Consequently, it is not only thus possible to prevent the undesired additional stresses which occur during the fabrication of wire glass with the known production techniques because of the stretching effect of the glass band which considerably increases towards the surface of the glass, but also it is possible to achieve up to 50% increased strength of the wire glass. It has been found that with constant viscosity and band velocity too small a cross-section of the longitudinal wire inserts again diminishes the novel effect of the increased strength noted and described above. In similar manner this effect is lost if the wire cross-section remains the same but the cross-section of the glass band increases. A suitable ratio of the cross-sectional area of the wire inserts to that of the glass band has been found to be about 1:12.

When applying higher tensional forces the wires embedded in the glass band at the region of increased viscosity of the glass band can rupture because of overstretching or elongation. This results in a product which not only has an impaired unattractive appearance of such wire glass, but furthermore diminishes or annihiliates the splinter-bonding effect throughout the glass zones free of wires. However, this can be prevented if wires are embedded which possess predetermined wire rupture locations, resulting in a regular pattern when the wires rupture during stretching of the glass band. To this end, it is possible to provide in front of the first pair of rollers an additional pair of rollers, the roller elements 35 and 36 of which possess a greater spacing from one another. Such type rollers 35 and 36 have been shown in FIGS. 12 to 14 inclusive, and additionally it will be seen that the surfaces of these rollers 35, 36 are provided with cams or dogs 37 which, during rotation of such rolls 35, 36 always contact one another and notch the throughpassing wires at certain spaces along their length. Then, in the presence of a suitable stretching or elongation force the wires tend to tear or rupture at the location of these notches, resulting in a regular or uniform pattern of the wire pieces which result from such rupture of the initial continuous wire, as best shown by the glass band arrangement of FIG. 10.

Figure 10:
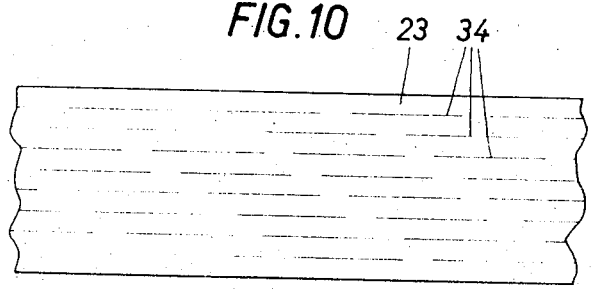
FIGS. 10 and 11 are respective plan views of glass bands or shpets containing embedded wires.
Figure 11:
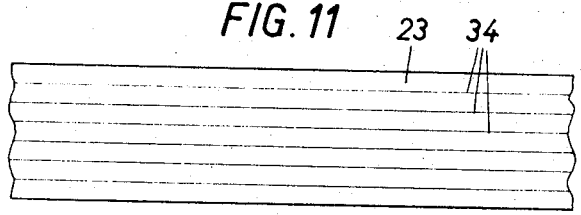
Figure 12:
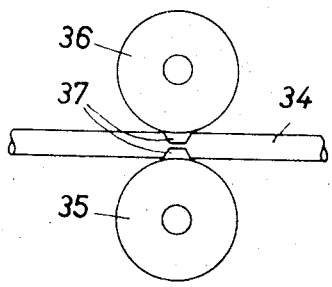
FIGS. 12, 13 and 14 are different views of a pair of rolls for notching the embedded wires.
Figure 13:
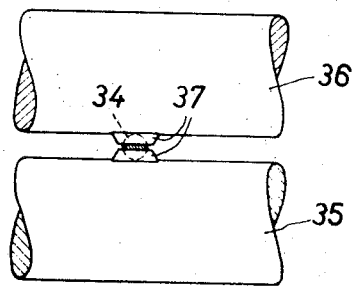
Figure 14:
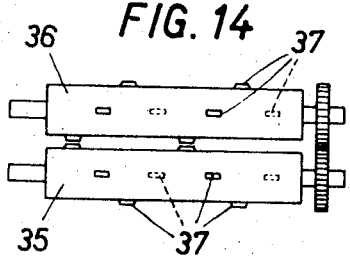

Furthermore, as will be best understood by referring to FIG. 14, when there are employed a number of parallelly extending wires in the glass band the cams 37 are arranged in cyclically offset fashion with respect to one another at the surfaces of the rolls 35 and 36 so that the regular wire pattern is formed in the glass band as illustrated in FIG. 10. Since upon rupture or breakage of such a wire glass always a number of wire segments or pieces are crossed by the glass spinters the requisite splinter adherence characteristics imposed upon the manufacture by various regulatory agencies concerned with glass safety is fully complied with.

Of course the inventive method techniques can also be used for the production of glass having a different shaped cross-section from a flat band.

While there is shown and described present preferred embodiments of the invention, it is to be distinctly understood that the invention is not limited thereto, but may be otherwise variously embodied and practiced within the scope of the following claims.

Accordingly, what is claimed is:

1. A method for the production of glass, especially glass possessing a substantially band-like cross-sectional configuration, comprising the steps of: conveying the glass along a predetermined production path, controlling the viscosity of the glass during movement along the production path so that it amounts to between $10^3$ and $10^{10}$ poise, exerting a pressure upon the glass which is substantially uniform at its front and back faces, during such time as the glass viscosity is in the range between $10^3$ and $10^{10}$ poise, by impacting the glass with the same fluent pressurized medium at a pressure in the range of about 0.7 to 6 atmospheres excess pressure, stretching the glass while impacting said glass with excess pressure, and controlling the temperature of the pressurized medium such that it possesses approximately the same temperature as the glass at the location where it is impacted by the pressurized medium.

2. A method for the production of glass as defined in claim 1, wherein solely the front and back faces of the glass are impinged with the pressurized medium.

3. A method for the production of glass as defined in claim 2, including the step of carrying out impact of the glass with the pressurized medium in the free atmosphere.

4. A method for the production of glass as defined in claim 3, wherein the fluent medium is an inert gas.

5. A method for the production of glass as defined in claim 4, wherein the inert gas is helium.

6. A method for the production of glass as defined in claim 3, wherein the fluent medium is air.

7. A method for the production of glass as defined in claim 3, wherein the fluent medium is nitrogen.

8. A method for the production of glass as defined in claim 3, wherein the fluent medium is a liquid-gas mixture.

9. A method for the production of glass as defined in claim 3, wherein the fluent medium is a liquid.

10. A method for the production of glass as defined in claim 3, wherein the fluent medium is a liquid mixture.

11. A method for the production of glass as defined in claim 2, wherein the fluent medium contains anhydrous salts constituting the solid constituents thereof.

12. A method for the production of glass as defined in claim 11, wherein the fluent medium contains a member selected from the group comprising potassium, rubidium and cesium.

13. A method for the production of glass as defined in claim 2, further including the steps of stretching the glass in a stretching zone by at least 30% at the region of impact by the pressurized medium.

14. A method for the production of glass as defined in claim 13, further including the steps of embedding insert means in the glass during production thereof, such insert means diminishing the stretching of the glass by that amount by which the glass particles surrounding the insert means are entrained by such insert means during the stretching operation.

15. A method for the production of glass as defined in claim 13, including the step of controlling the natural thermal losses of the glass throughout the stretching zone so that such thermal losses amount at a maximum to 300°C.

16. A method for the production of glass as defined in claim 13, including the step of controlling the viscosity of the glass at the stretching zone, so that it amounts to at least approximately $10^3$ poise.

17. A method for the production of glass as defined in claim 13, further including the steps of providing at the glass stretching zone two separate stretching locations along the production path at which the glass is stretched, said two separate locations defining a first stretching location and a second stretching location, and controlling the viscosity of the glass such that at the first stretching location it amounts to at least approximately $10^3$ poise and at the second stretching location such viscosity does not exceed $10^{10}$ poise, and controlling the thermal losses of the glass throughout the first stretching location so that such thermal losses at most amount to 300°C and further controlling the thermal losses of the glass throughout the second stretching location so that such thermal losses at most amount to 150°C.

18. A method for the production of glass as defined in claim 17, including the steps of controlling stretching of the glass at the aforesaid two separate locations such that the glass is stretched to different degrees at each respective location.

19. A method for the production of glass as defined in claim 17, wherein the total stretching of the glass is in a range of about 60% to 80%.

20. A method for the production of glass as defined in claim 13, further including the steps of permitting glass to flow from a glass melting furnace over a lip freely downwardly, with stretching of the glass being accomplished due to the effects of gravity acting upon the downwardly flowing glass, maintaining the stretching zone free from contact with the surrounding air, and further maintaining the stretching zone free from contact with the furnace air.

21. A method for the production of glass as defined in claim 20, wherein the step of maintaining the stretching zone free from contact with the furnace air is accomplished by the step of providing a slide member in front of said lip which immerses into the glass of the furnace, and controlling the immersion depth of the slide member into the glass in order to regulate the thickness of the glass flowing downwardly over the lip.

22. A method for the production of glass as defined in claim 21, further including the step of electrically heating the slide member to the temperature of the glass.

23. A method for the production of glass as defined in claim 13, further including the steps of accomplishing stretching of the glass by passing the glass between at least one pair of substantially cylindrical rolls which exert a tensional force upon the glass.

24. A method for production of glass as defined inclaim 13, wherein stretching of the glass is accomplished with the aid of substantially cylindrical rollers arranged in succession in the direction of movement of the glass and which frictionally engage with the glass which is being conveyed, this stretching operation being accomplished by providing a higher peripheral velocity for at least one of the successively arranged rollers.

25. A method for the production of glass as defined in claim 2, further including the steps of embedding insert means in the glass during production thereof, such insert means being embedded approximately at the central region of the cross-sectional area of the glass.

26. A method for the production of glass as defined in claim 2, further including the steps of embedding insert means in the glass during production thereof, and providing such insert means with weakened portions at regularly offset locations with respect to one another, which weakened portions rupture during stretching of the glass so that a plurality of pieces of such insert means are ultimately embedded in the glass.

* * * * *